US010148807B2

(12) United States Patent
Kim et al.

(10) Patent No.: US 10,148,807 B2
(45) Date of Patent: Dec. 4, 2018

(54) ELECTRONIC DEVICE AND METHOD OF VOICE COMMAND PROCESSING THEREFOR

(71) Applicant: SAMSUNG ELECTRONICS CO., LTD., Suwon-si, Gyeonggi-do (KR)

(72) Inventors: Daeyoung Kim, Yongin-si (KR); Sangwook Shin, Seoul (KR); Kyungtae Kim, Hwaseong-si (KR); Yongjoon Jeon, Hwaseong-si (KR); Minkyung Hwang, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/373,892

(22) Filed: Dec. 9, 2016

(65) Prior Publication Data

US 2017/0230497 A1    Aug. 10, 2017

(30) Foreign Application Priority Data

Feb. 4, 2016   (KR) .................. 10-2016-0014457

(51) Int. Cl.
*H04M 1/00*       (2006.01)
*H04M 1/725*      (2006.01)
(Continued)

(52) U.S. Cl.
CPC ......... *H04M 1/72583* (2013.01); *G10L 15/22* (2013.01); *G10L 15/32* (2013.01); (Continued)

(58) Field of Classification Search
CPC ....... G06F 3/0482; G10L 15/22; G10L 15/26; G10L 15/30; G10L 2015/223; (Continued)

(56) References Cited

U.S. PATENT DOCUMENTS 8,107,401 B2   1/2012  John et al.
8,139,727 B2   3/2012  Awad et al.
(Continued)

FOREIGN PATENT DOCUMENTS

JP      2003-108188      4/2003

*Primary Examiner* — Xin Jia
(74) *Attorney, Agent, or Firm* — Nixon & Vanderhye, P.C.

(57) ABSTRACT

Provided are an electronic device and method of voice command processing therefor. The electronic device may include: a housing having a surface; a display disposed in the housing and exposed through the surface; an audio input interface comprising audio input circuitry disposed in the housing; an audio output interface comprising audio output circuitry disposed in the housing; at least one wireless communication circuit disposed in the housing and configured to select one of plural communication protocols for call setup; a processor disposed in the housing and electrically connected with the display, the audio input interface, the audio output interface, the at least one wireless communication circuit, and a codec; and a memory electrically connected with the processor. The memory may store at least one codec supporting multiple modes associated with different frequency bands. The memory may store instructions that, when executed, cause the processor to perform operations comprising: setting up a call using the wireless communication circuit, selecting one of the multiple modes based on the selected communication protocol, selecting a speech recognition model based on the selected mode, receiving a voice command from the outside of the electronic device using the wireless communication circuit, and processing the voice command using the selected speech recognition model.

16 Claims, 11 Drawing Sheets

(51) Int. Cl.
 *G10L 15/22* (2006.01)
 *G10L 15/32* (2013.01)
(52) U.S. Cl.
 CPC ... *H04M 1/72569* (2013.01); *H04M 1/72597* (2013.01); *G10L 2015/223* (2013.01); *H04M 2201/40* (2013.01); *H04M 2201/42* (2013.01); *H04M 2201/60* (2013.01)
(58) Field of Classification Search
 CPC ......... H04M 1/72569; H04M 1/72583; H04M 1/72597; H04M 2201/40; H04M 2201/42; H04M 2201/60
 See application file for complete search history.

(56) References Cited

U.S. PATENT DOCUMENTS

| | | | | |
|---|---|---|---|---|
| 2008/0235029 | A1* | 9/2008 | Cross | G10L 15/183 704/275 |
| 2010/0056221 | A1* | 3/2010 | Park | G06F 3/048 455/566 |
| 2011/0281580 | A1* | 11/2011 | Tonogai | H04M 3/42314 455/426.1 |
| 2012/0143599 | A1* | 6/2012 | Seltzer | G10L 15/02 704/205 |
| 2013/0332159 | A1* | 12/2013 | Federighi | G10L 15/26 704/235 |
| 2016/0127534 | A1* | 5/2016 | Celik | H04M 1/72552 455/566 |
| 2016/0247511 | A1* | 8/2016 | Assem Aly Salama | G10L 19/0018 |

\* cited by examiner

ELECTRONIC DEVICE AND METHOD OF VOICE COMMAND PROCESSING THEREFOR

CROSS-REFERENCE TO RELATED APPLICATION

The present application is based on and claims benefit under 35 U.S.C. § 119 to a Korean patent application filed Feb. 4, 2016 in the Korean intellectual property office and assigned serial number 10-2016-0014457, the disclosure of which is incorporated by reference herein in its entirety.

TECHNICAL FIELD

The present disclosure relates generally to an electronic device and method of processing voice commands therefor.

BACKGROUND

Electronic devices supporting various functions have become a necessity of modern life. Electronic devices have evolved into multimedia communication appliances that can provide voice call services, data transmission services, and other supplementary services.

To use a supplementary service, the user of an electronic device may enter a touch event into an application associated with the supplementary service. With recent advances in technologies, users may execute application functions through not only touch events but also voice inputs.

An electronic device may recognize the speech of a user by use of a special module. However, the speech recognition rate of the electronic device may be degraded according to variations in characteristics of the speech signal in a call with a counterpart device. For example, the frequency band used for a call between the electronic device and a counterpart device may change depending upon network conditions, and the speech codec selected for speech recognition may be changed accordingly. Use of different speech codecs may cause reduction of the speech recognition rate.

Such an electronic device may experience a call setup failure when a call is missed by the user, when another call request is received during one call, or when the speech of the counterpart is to be converted into text. In this case, the user may be inconvenienced by having to separately record the speech of the counterpart. A call setup failure may occur when a call setup request is received from an external device while the user of the electronic device is not present, or when another call request is received from a second external device while the electronic device is already engaged in a call with a first external device.

SUMMARY

Accordingly, an example aspect of the present disclosure is to provide an electronic device and method of processing voice commands therefor that addresses the above mentioned problem.

In accordance with an example aspect of the present disclosure, an electronic device is provided. The electronic device may include: a housing having a surface; a display disposed in the housing and exposed through the surface; an audio input interface comprising audio input circuitry disposed in the housing; an audio output interface comprising audio output circuitry disposed in the housing; at least one wireless communication circuit disposed in the housing and configured to select one of plural communication protocols for call setup; a processor disposed in the housing and electrically connected with the display, the audio input interface, the audio output interface, the at least one wireless communication circuit, and a codec; and a memory electrically connected with the processor. The memory may store at least one codec supporting multiple modes associated with different frequency bands. The memory may store instructions that, when executed, cause the processor to perform operations comprising: setting up a call using the wireless communication circuit, selecting one of the modes based on the selected communication protocol, selecting a speech recognition model based on the selected mode, receiving a voice command from the outside of the electronic device using the wireless communication circuit, and processing the voice command using the selected speech recognition model.

In accordance with another example aspect of the present disclosure, an electronic device is provided. The electronic device may include: a housing having a surface; a display disposed in the housing and exposed through the surface; an audio input interface comprising audio input circuitry disposed in the housing; an audio output interface comprising audio output circuitry disposed in the housing; at least one wireless communication circuit disposed in the housing and configured to select one of plural communication protocols for call setup; a processor disposed in the housing and electrically connected with the display, the audio input interface, the audio output interface, the at least one wireless communication circuit, and a codec; and a memory electrically connected with the processor. The memory may store at least one codec supporting multiple modes associated with different frequency bands. The memory may store instructions that, when executed, cause the processor to perform operations comprising: setting up a call using the wireless communication circuit, selecting one of the modes based on the selected communication protocol, sending information on the selected mode to a server using the wireless communication circuit, receiving a voice command from the outside of the electronic device using the wireless communication circuit, sending the voice command to the server using the wireless communication circuit, and receiving data or information from the server as a result of processing the voice command by the server.

In accordance with another example aspect of the present disclosure, there is provided a method for processing voice commands in an electronic device. The method may include: setting up a call through a wireless communication circuit; selecting one of multiple modes associated with different frequency bands based on a selected one of communication protocols for call setup; selecting a speech recognition model based on the selected mode; receiving a voice command from the outside of the electronic device through the wireless communication circuit; and processing the voice command using the selected speech recognition model.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
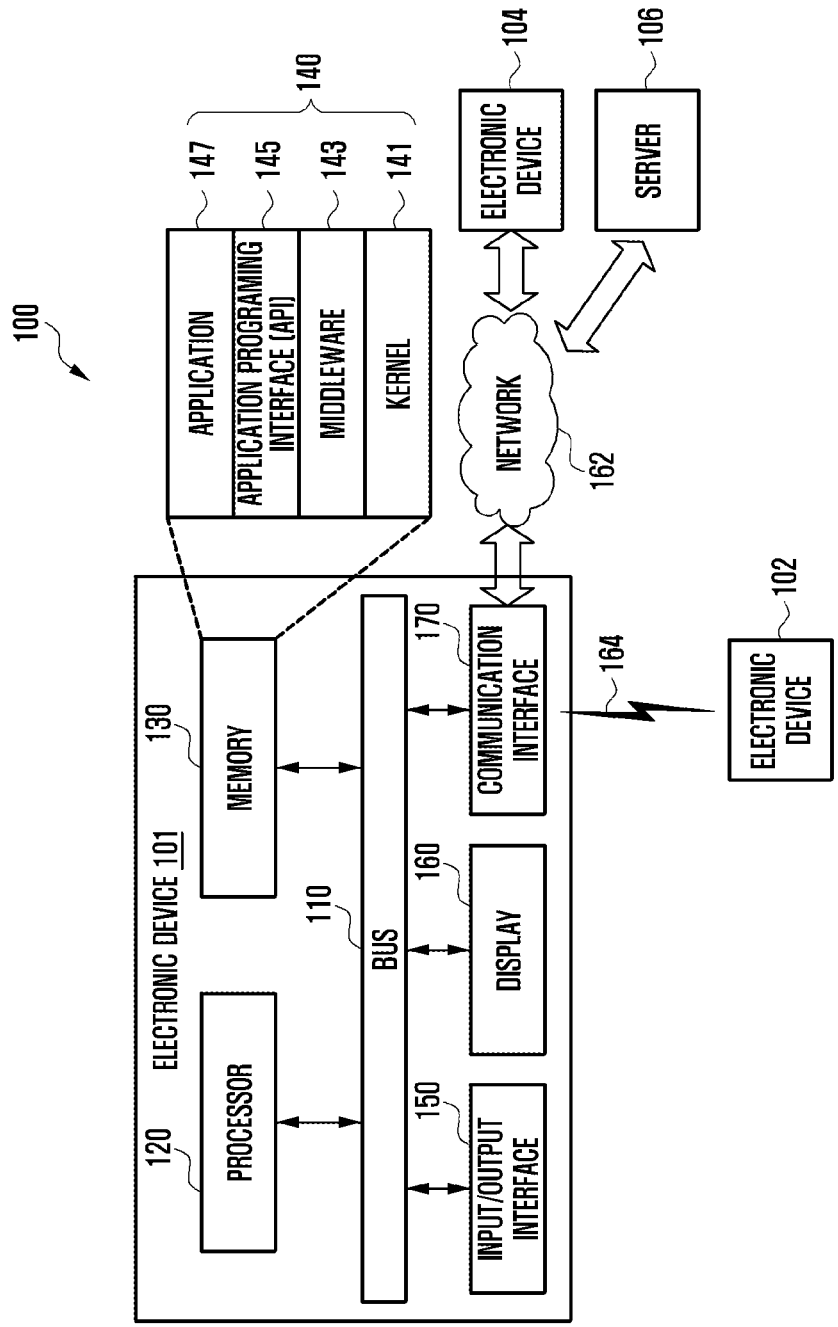
FIG. 1 is a diagram illustrating an example network environment according to various example embodiments of the present disclosure.

The following description, with reference to the accompanying drawings, is provided to assist in a comprehensive understanding of various example embodiments of the present disclosure as defined by the claims and their equivalents. It includes various specific details to assist in that understanding but are to be regarded as merely examples. Accordingly, those of ordinary skill in the art will recognize that various changes and modifications of the example embodiments described herein may be made without departing from the scope and spirit of the present disclosure. In addition, descriptions of well-known functions and constructions may be omitted for clarity and conciseness.

Expressions such as "include" and "may include" which may be used in the present disclosure denote the presence of the disclosed functions, operations, and constituent elements and do not limit one or more additional functions, operations, and constituent elements. In the present disclosure, terms such as "include" and/or "have" may be construed to denote a certain characteristic, number, step, operation, constituent element, component or a combination thereof, but may not be construed to exclude the existence of, or a possibility of, the addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element may be referred to as a second element, and similarly, a second element may also be referred to as a first element without departing from the scope of the present disclosure.

In the case where a component is referred to as being "connected" to, or "accessed" by another component, it should be understood that not only is the component directly connected to or accessed by the other component, but there may also exist another component between them. Meanwhile, in the case where a component is referred to as being "directly connected" or "directly accessed" to another component, it should be understood that there is no component therebetween.

The terms used in the present disclosure are only used to describe specific embodiments, and do not limit the present disclosure. As used herein, the singular forms are intended to include the plural forms as well, unless the context clearly indicates otherwise.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD)) such as electronic eyeglasses, electronic clothes, an electronic bracelet, an electronic necklace, an electronic appcessory, or a smart watch), or the like, but is not limited thereto.

According to an embodiment of the present disclosure, an electronic device may be a smart home appliance that involves a communication function. For example, an electronic device may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

Other example embodiments of the electronic device include various medical devices (for example, various kinds of portable medical measuring device (blood glucose meter, heart rate meter, blood pressure meter, or a temperature measuring instrument, etc.), magnetic resonance angiography (MRA), magnetic resonance imaging (MRI), computed tomography (CT), camcorder, or ultrasonography etc., navigation (navigation) devices, global positioning system receiver (GPS) receiver, EDR (event data recorder), flight data recorder (FDR), automotive infotainment (infotainment) devices, marine electronic equipment (e.g., marine navigation systems, gyrocompass, etc.), aviation electronics (avionics), security devices, automotive head unit (head unit), industrial or household robots, financial institutions, automatic teller machine (ATM), point of sales (POS) terminals, or Internet of Things (IoT) devices (e.g. light bulbs, various sensors, electric or gas meters, sprinkler systems, fire alarms, thermostat, street lights, toaster, fitness equipment, hot water tank, a heater, a boiler, etc.), or the like, but is not limited thereto.

According to an embodiment of the present disclosure, an electronic device may be furniture or a building/structure of the portion, an electronic board, an electronic sign-receiving device (electronic signature receiving device), a projector, or various measuring devices (e.g. water, electricity, gas, or a radio wave measuring equipment, etc.), or the like, but is not limited thereto. The electronic device may be one or more combinations of the various devices described above. The electronic device may be a flexible electronic device. In addition, an electronic device is not limited to the above-described device, and may include a new electronic device, in accordance with new technological developments. In this document, the term user may refer, for example, to a human or an electronic device using the electronic device (for example, an artificial intelligence electronic device).

FIG. 1 is a block diagram illustrating an example network environment 100 including an electronic device 101 in accordance with an example embodiment of the present disclosure. Referring to FIG. 1, the electronic device 101 includes a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit designed for connecting the above-discussed elements and communicating data (e.g., a control message) between such elements.

The processor 120 may receive commands from the other elements (e.g., the memory 130, the input/output interface 150, the display 160, or the communication interface 170, etc.) through the bus 110, and include various processing circuitry configured to interpret the received commands, and perform arithmetic or data processing based on the interpreted commands.

The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be composed of software, firmware, hardware, and any combination thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 may be used by one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various input/output circuitry that deliver commands or data, entered by a user through an input/output unit (e.g., circuitry that may include, for example, and without limitation, a sensor, a keyboard, or a touch screen, or the like), to the processor 120, the memory 130, or the communication interface 170 via the bus 110.

The display (e.g., display "module") 160 may include, for example, a liquid crystal display (LCD), a light emitting diode (LED) display, an organic LED (OLED) display, a micro electro mechanical system (MEMS) display, or an electronic paper display, or the like, but is not limited thereto. The display 160 may display various types of content (e.g., text, images, videos, icons, or symbols) for users. The display module 160 may include a touch screen, and may receive, for example, a touch, gesture, proximity, or hovering input by using an electronic device or a part of the user's body.

The communication interface 170 may include various communication circuitry configured to perform communication between the electronic device 101 and the electronic device 104 or the server 106. For example, the communication interface 170 may communicate with any external device by being connected with a network 162 through a wired or wireless communication or via a wireless (e.g., short range wireless) connection 164.

The wireless communication may include, but not limited to, at least one of wireless fidelity (WiFi), Bluetooth (BT), near field communication (NFC), global navigation satellite system (GNSS), or a cellular communication (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (Wi-Bro), global system for mobile communications (GSM), etc.). The GNSS may include at least one of global positioning system (GPS), global navigation satellite system (Glonass), Beidou navigation satellite system (Beidou), Galileo, or the European global satellite-based navigation system. Hereinafter, the terms "GPS" and the "GNSS" may be interchangeably used herein. The wired communication may include, at least one of universal serial bus (USB), high definition multimedia interface (HDMI), RS-232 (recommended standard 232), or plain old telephone service (POTS). The network 162 includes, as a telecommunications network at least one of a computer network (e.g., local area network (LAN) or wide area network (WAN)), the Internet, and a telephone network.

The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102, 104 or the server 106. In the case where the electronic device 101 performs a certain function or service automatically or in response to a request, the electronic device 101 may request at least a portion of functions related to the function or service from another electronic device 102, 104 or the server 106 instead of, or in addition to, performing the function or service for itself. The other electronic device 102, 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
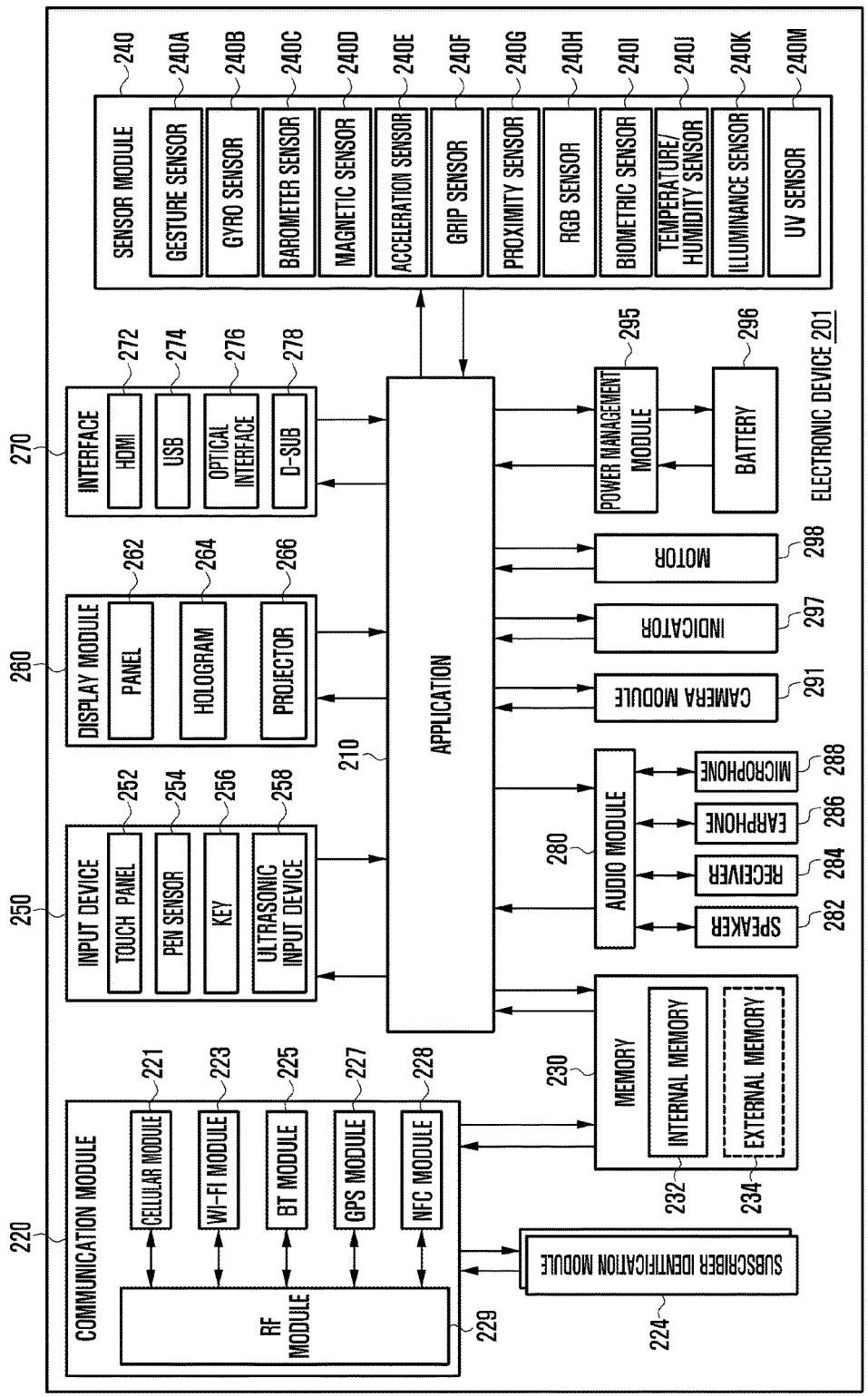
FIG. 2 is a block diagram illustrating an example electronic device according to various example embodiments of the present disclosure.

FIG. 2 is a block diagram illustrating an example electronic device 201 in accordance with an example embodiment of the present disclosure. The electronic device 201 may form, for example, the whole or part of the electronic device 101 illustrate in FIG. 1. Referring to FIG. 2, the electronic device 201 includes at least one application processor (AP) (e.g., including processing circuitry) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may include various processing circuitry, such as, for example, a dedicated processor, CPU, or the like, and may be formed of a system-on-chip (SoC), for example. According to an embodiment of the present disclosure, the AP 210 may further include a graphic processing unit (GPU).

The communication module 220 (e.g., the communication interface 170) may include various communication circuitry configured to perform data communication with the electronic device 104 or the server 106 connected to the electronic device 201 (e.g., the electronic device 101) through the network. According to an embodiment of the present disclosure, the communication module 220 may include various communication circuitry, such as, for example, and without limitation, a cellular module 221, a WiFi module 223, a BT module 225, a GNSS module 227, an NFC module 228, and an RF (radio frequency) module 229.

The cellular module 221 may offer a voice call, a video call, a message service, an internet service, and the like through a communication network (e.g., machine type communications (MTC), fifth generation (5G), long term evolution (LTE), long term evolution advanced (LTE-A), code division multiple access (CDMA), wideband code division multiple access (WCDMA), universal mobile telecommunications system (UMTS), wireless broadband (WiBro), global system for mobile communications (GSM), wireless fidelity (Wi-Fi), Bluetooth, and near field communications (NFC) etc.). Additionally, the cellular module 221 may perform identification and authentication of the electronic device in the communication network, using the SIM card 224. According to an embodiment of the present disclosure, the cellular module 221 may perform at least part of functions the AP 210 may provide. For example, the cellular module 221 may perform at least part of a multimedia control function. Each of the WiFi module 223, the BT module 225, the GNSS module 227 and the NFC module 228 may include a processor for processing data transmitted or received. Although FIG. 2 shows the cellular module 221, the WiFi module 223, the BT module 225, the GNSS module 227 and the NFC module 228 as different blocks, at least part of them may be contained in a single IC (integrated circuit) chip or a single IC package.

The RF module 229 may transmit and receive data, e.g., RF signals or any other electric signals. The RF module 229 may include a transceiver, a PAM (power amp module), a frequency filter, an LNA (low noise amplifier), and the like. Although FIG. 2 shows that the cellular module 221, the WiFi module 223, the BT module 225, the GNSS module 227 and the NFC module 228 share the RF module 229, at least one of them may perform transmission and reception of RF signals through a separate RF module.

The SIM card 224 may include, for example, an embedded SIM including a user identification module, and may include unique identification information (e.g., an integrated circuit card identifier (ICCID)) or subscriber information (e.g., international mobile subscriber identity (IMSI)).

The memory 230 includes an internal memory 232 and/or an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-secure digital (micro-SD), a mini-secure digital (mini-SD), an extreme digital (xD), a memory stick, and the like. The external memory 234 may be functionally connected to the electronic device 201 through various interfaces.

The sensor module 240 may measure physical quantity or sense an operating status of the electronic device 201, and then convert measured or sensed information into electric signals. The sensor module 240 includes, for example, at least one of a gesture sensor 240A, a gyro sensor 240B, an atmospheric (e.g., barometer or barometric) sensor 240C, a magnetic sensor 240D, an acceleration sensor 240E, a grip sensor 240F, a proximity sensor 240G, a color sensor 240H (e.g., RGB or "red, green, blue" sensor), a biometric sensor 240I, a temperature-humidity sensor 240J, an illumination (e.g., illuminance or light) sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor, or a finger scan sensor. Also, the sensor module 240 may include a control circuit for controlling one or more sensors equipped therein.

The input unit 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user. The pen sensor 254 (e.g., a digital pen sensor), for example, may be implemented by using a method identical or similar to a method of receiving a touch input from the user, or by using a separate sheet for recognition. For example, a key pad or a touch key may be used similar to the keys 256. The ultrasonic input unit 258 enables the terminal to sense a sound wave by using a microphone 288 of the terminal through a pen generating an ultrasonic signal, and to identify data.

The display 260 (e.g., the display 160) includes a panel 262, a hologram 264, or a projector 266. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment of the present disclosure, the display 260 may further include a control circuit for controlling the panel 262, the hologram 264, and the projector 266.

The interface 270 may include various interface circuitry, such as, for example, and without limitation, an HDMI (high-definition multimedia interface) 272, a USB (universal serial Bus) 274, an optical interface 276, or a D-sub (D-sub-miniature) 278. The interface 270 may be contained, for example, in the communication interface 170 illustrated in FIG. 1. Additionally or alternatively, the interface 270 may include, for example, an MHL (mobile high-definition link) interface, an SD (secure digital) card/MMC (multi-media card) interface, or an IrDA (infrared data association) interface.

The audio module 280 may perform a conversion between sounds and electric signals. At least part of the audio module 280 may be contained, for example, in the input/output interface 150 illustrated in FIG. 1. The audio module 280 may process sound information inputted or outputted through a speaker 282, a receiver 284, an earphone 286, or a microphone 288.

The camera module 291 is a device capable of obtaining still images and moving images. According to an embodiment of the present disclosure, the camera module 291 may include at least one image sensor (e.g., a front sensor or a rear sensor), a lens, an ISP (image signal processor, not shown), or a flash (e.g., LED or xenon lamp, not shown).

The power management module 295 may manage electric power of the electronic device 201. The power management module 295 may include, for example, a PMIC (power management integrated circuit), a charger IC, or a battery charge gauge. The PMIC may be implemented by, for example, an IC or an SoC semiconductor. Charging methods may be classified into a wired charging method and a wireless charging method. A wireless charging type may include, for example, a magnetic resonance type, a magnetic induction type, or an electromagnetic type. Any additional circuit for wireless charging may be further used such as a coil loop, a resonance circuit, or a rectifier. The battery gauge may measure the residual charge amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. The electronic device 201 may include a specific processor (e.g., GPU) for supporting a mobile TV. This processor may process media data that comply with standards of DMB (digital multimedia broadcasting), DVB (digital video broadcasting), or MediaFlo™.

Each of the above-discussed elements of the electronic device disclosed herein may be formed of one or more components, and its name may vary according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
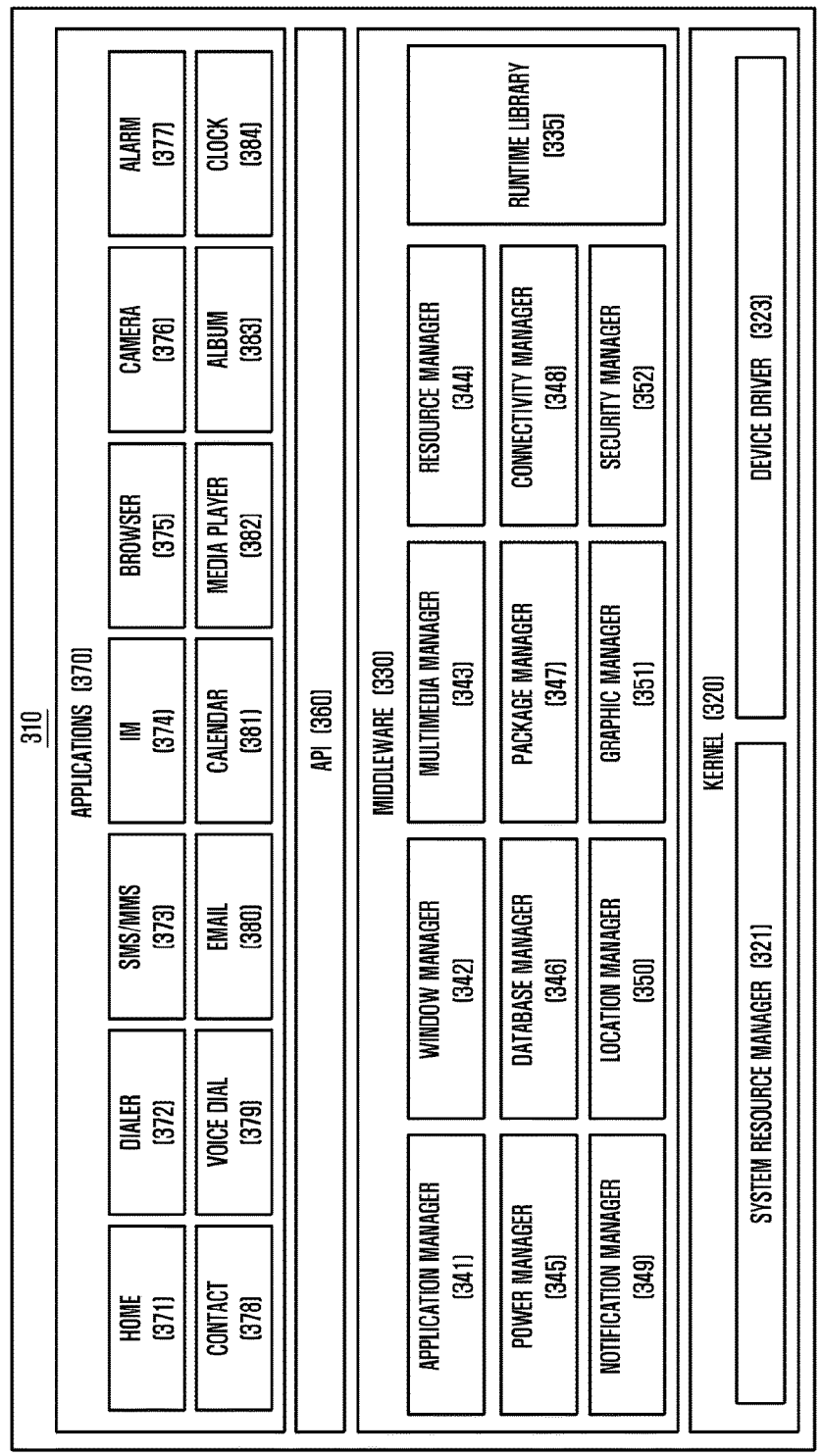
FIG. 3 is a block diagram illustrating an example program module according to various example embodiments of the present disclosure.

FIG. 3 is a block diagram illustrating an example program module, according to an example embodiment of the present disclosure.

Referring to FIG. 3, a program module 310 (e.g., the program 140) may include an operating system (OS) controlling resources related to the electronic device (e.g., the electronic device 101) and/or various applications (e.g., the application 147) that are driven on the operating system. The operating system may include, e.g., Android™, iOS™, Windows™, Symbian™, Tizen™, or Bada™.

The program module 310 includes a kernel 320, middleware 330, an API 360, and/or an application 370. At least a part of the program module 310 may be preloaded on the electronic device or may be downloaded from the electronic device 104 or the server 106. The kernel 320 (e.g., the kernel 141 of FIG. 1) may include, e.g., a system resource manager 321 and/or a device driver 323. The system resource manager 321 may perform control, allocation, or recovery of system resources and may include a process managing unit, a memory managing unit, and/or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. The middleware 330 (e.g., middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler to add a new function through a programming language while, e.g., the application 370 is being executed. The runtime library 335 may perform input/output management, memory management, and/or arithmetic functions.

The application manager 341 may manage the life cycle of at least one application of, e.g., the applications 370. The window manager 342 may manage graphical user interface (GUI) resources used on the screen. The multimedia manager 343 may determine formats necessary to play various media files and use a codec appropriate for a format to perform encoding or decoding on media files. The resource manager 344 may manage resources, such as source code of at least one of the applications 370, memory and/or storage space.

The power manager 345 may operate together with, e.g., a basic input/output system (BIOS) to manage battery or power and provide power information necessary for operating the electronic device. The database manager 346 may generate, search, and/or query a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as an incoming message, appointment, and/or proximity notification without interfering with the user. The location manager 350 may manage location information on the electronic device. The graphic manager 351 may manage graphic effects to be offered to the user and their related user interface. The security manager 352 may provide various security functions necessary for system security and/or user authentication. When the electronic device (e.g., the electronic device 101) has telephony capability, the middleware 330 may further include a telephony manager for managing voice call and/or video call functions of the electronic device. The middleware 330 may include various functions of the above-described components. The middleware 330 may provide a specified module per type of operating system to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) includes one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar level), and/or environmental information (e.g., provision of air pressure, moisture, or temperature information). The application 370 may include information exchanging application supporting information exchange between the electronic device (e.g., the electronic device 101) and an external electronic device 102 and 104. Examples of the information exchange application may include, but is not limited to, a notification relay application for transferring specific information to the external electronic device, or a device management application for managing the external electronic device. For example, a notification relay application may include a function for relaying notification information generated from other applications of the electronic device (e.g., the SMS/MMS application, the email application, the health-care application, or the environmental information application) to the external electronic devices 102 and 104. Further, the notification relay application may receive notification information from, e.g., the external electronic device and may provide the received notification information to the user. A device management application may perform at least some functions of the external electronic device 102 or 104 such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 370 may include an application (e.g., a health-care application) selected depending on the attribute (e.g., as an attribute of the electronic device, the type of electronic device is a mobile medical device) of the external electronic device 102 and 104. The application 370 may include an application received from the server 106 or electronic devices 102 and 104. The application 370 may include a preloaded application or a third party application downloadable from a server. The names of the components of the program module 310 may be vary depending on the type of operating system. At least a part of the program module 310 may be implemented in software, firmware, hardware, or in a combination of two or more thereof. At least a part of the programming module 310 may be implemented (e.g., executed) by e.g., a processor (e.g., the AP 210). At least a part of the program module 310 may include e.g., a module, a program, a routine, a set of instructions, a process, and the like for performing one or more functions.

Figure 4:
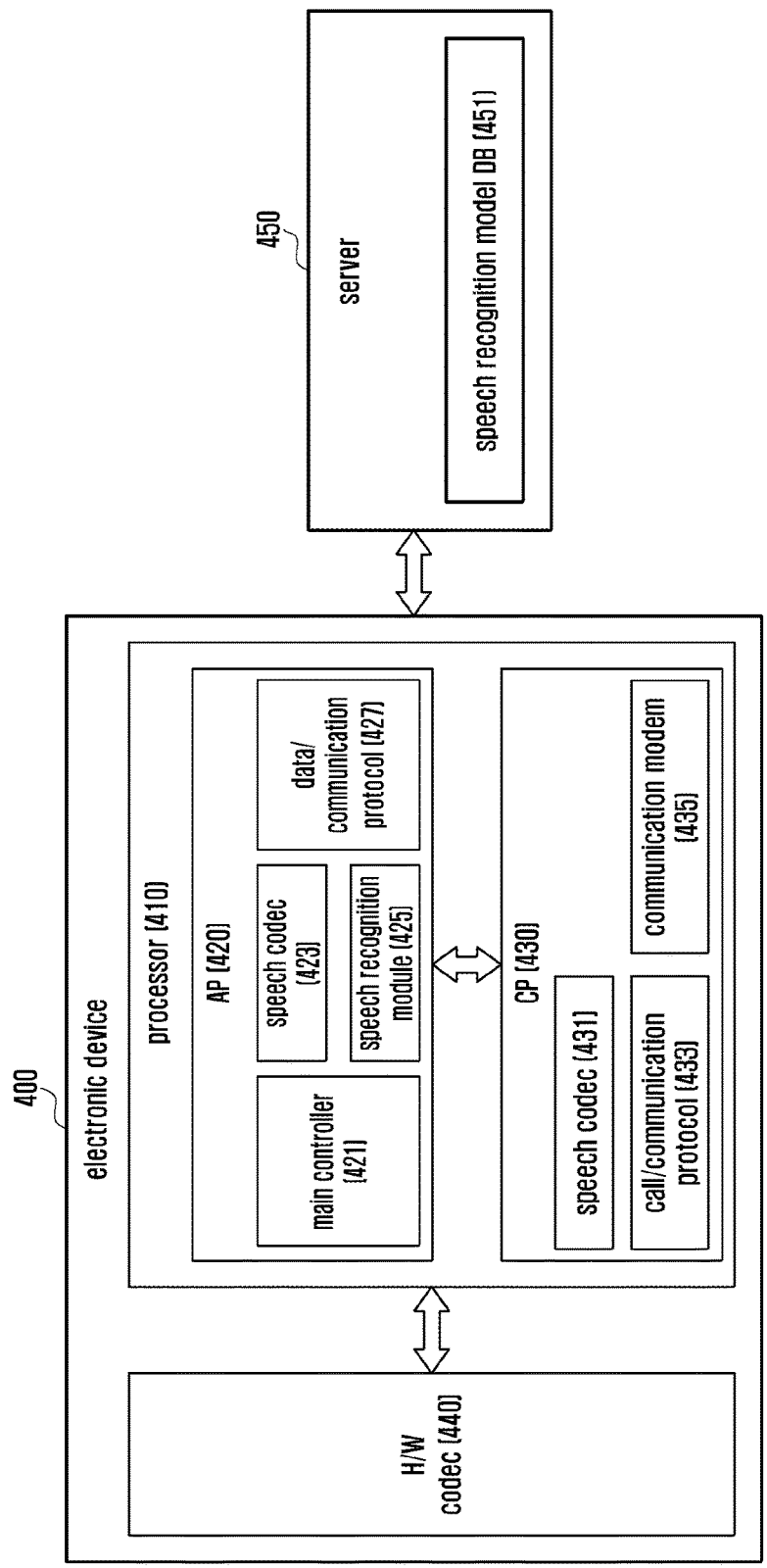
FIG. 4 is a block diagram illustrating an example electronic device according to various example embodiments of the present disclosure.

FIG. 4 is a block diagram illustrating an example electronic device 400 according to various example embodiments of the present disclosure.

In an example embodiment, the electronic device 400 may include at least one processor (e.g., including processing circuitry and program modules) 410 and a hardware codec 440. The electronic device 400 may correspond to the electronic device 101 illustrated in FIG. 1 or the electronic device 201 illustrated in FIG. 2. The electronic device 400 may further include one or more components comparable with those of the electronic device 101 or 201.

The processor 410 may include various processing circuitry, such as, for example, and without limitation, an application processor (AP) 420 and a communication processor (CP) 430. The processor 410 may correspond to the processor 120 illustrated in FIG. 1 or the processor 210 illustrated in FIG. 2. The AP 420 may include a main controller 421, a speech codec 423, a speech recognition module 425, and a data/communication protocol 427. The CP 430 may include a speech codec 431, a call/communication protocol 433, and a communication modem 435. Various modules of the processor 410 may be implemented in hardware (e.g., circuitry), software (e.g., program module), firmware, or any combination thereof.

In various example embodiments, the electronic device 400 may include a housing having a surface, and a display (not shown) disposed in the housing and exposed through the surface (e.g. display 160 or display 260). The electronic device 400 may include an audio input interface (not shown, e.g. including audio input circuitry, such as, for example, and without limitation, microphone 288) and an audio output interface (not shown, e.g. including audio output circuitry, such as, for example, and without limitation, speaker 282) in the housing. The electronic device 400 may include one or more wireless communication circuits (not shown, e.g. communication interface 170 or communication module 220) disposed in the housing to select one of communication protocols for call setup. In the housing of the electronic device 400, the processor 410 may be electrically connected with the display, audio input interface, audio output interface, one or more wireless communication circuits, and codec.

The electronic device 400 may include a memory (not shown, e.g. memory 130 or memory 230) electrically connected with the processor 410. The memory may store one or more codecs supporting different modes for different frequency bands. For example, the modes may be associated with narrowband, wideband and super-wideband. For example, the separation between narrowband, wideband, and super-wideband may be relative; and super-wideband frequencies may include wideband frequencies, which may then include narrowband frequencies.

The processor 410 may perform call setup using a wireless communication circuit. The processor 410 may select one of the multiple modes at least partially on the basis of a selected communication protocol. A communication protocol may refer to a rule or procedure for communication between electronic devices. The selected communication protocol may be changed on the basis of the operator providing communication protocols, network status information, and device specification.

The processor 410 may determine whether the speech codec for a call set up or to be set up is of narrowband mode, wideband mode or super-wideband mode. When a call is set up with a counterpart device according to the 3G technology, the processor 410 may identify the frequency band of the voice call signal by use of the speech codec 431, call/communication protocol 433, and communication modem 435 of the CP 430. The CP 430 may notify the AP 420 of the frequency band of the voice signal, and the speech recognition module 425 may be aware of the frequency band of the voice signal. The speech codec 431 may identify the frequency bandwidth and protocol of the network and select one of codec modes on the basis of the identified frequency bandwidth and/or protocol. The speech codec 431 may encode or decode a voice signal according to the selected codec mode.

The call/communication protocol 433 may be a protocol required for call communication. The communication modem 435 may be used for modulation, demodulation and analog/digital conversion of a communication signal.

When a call is set up with a counterpart device according to Voice over Long Term Evolution (Vo-LTE) or Voice over Wi-Fi (Vo-WiFi), the processor 410 may identify the frequency band of the voice call signal in the course of protocol negotiation with the counterpart device by use of the main controller 421. The main controller 421 may notify the speech recognition module 425 of the frequency band of the voice signal, and the speech recognition module 425 may be aware of the frequency band of the voice signal.

Upon reception of a request from a call handling application, the main controller 421 may perform an operation corresponding to the request. For example, the main controller 421 may receive a signal indicating (selecting) one of the electronic device 400 and an external device engaged in a call with the electronic device 400 as the source of voice commands, and control the speech recognition module 425 to process a voice command issued by the indicated device accordingly.

The main controller 421 may use the speech codec 423 and data/communication protocol 427 to process call related operations and use the speech recognition module 425 to perform speech recognition. The speech codec 423 may be a voice engine digitizing voice signals and may be a software-driven entity. The speech codec 423 may identify the frequency bandwidth and protocol of the network and select one of codec modes on the basis of the identified frequency bandwidth and/or protocol. The speech codec 423 may encode or decode a voice signal according to the selected codec mode. The data/communication protocol 427 may be used to send and receive data to and from an external device.

In an example embodiment, the processor 410 may select one of speech recognition models at least partially on the basis of the selected codec mode. The processor 410 may identify whether the voice signal of a call is of narrowband, wideband, or super-wideband on the basis of the selected mode of the speech codec, and select one of the speech recognition models stored in advance accordingly.

In various example embodiments, the electronic device 400 may receive and store a voice input for activating a speech recognition application. For example, the electronic device 400 may receive a specific word, phrase, or sentence from the user for activating a speech recognition application and store the received word, phrase, or sentence. The electronic device 400 may activate a speech recognition application by use of a stored word, phrase, or sentence. Speech recognition models may be based on at least one of a hidden Markov model (HMM) and an artificial neural network (ANN).

In various embodiments, speech recognition models may be generated and stored for different frequency bands. For example, a narrowband speech recognition model, wideband speech recognition model, and super-wideband speech recognition model may be prepared. When only a super-wideband speech recognition model covering a wider band is available, a narrowband speech recognition model and wideband speech recognition model may be generated by disabling some of the frequency bands of the super-wideband speech recognition model.

For example, when a narrowband call is set up with an external device, the processor 410 may select the narrowband one of the speech recognition models. When a wideband call is set up with an external device, the processor 410 may select the wideband one of the speech recognition models. When a super-wideband call is set up with an external device, the processor 410 may select the super-wideband one of the speech recognition models.

In various embodiments, when a speech recognition model for the user of a call is not stored, the processor 410 may perform an action to generate a speech recognition model. For example, the processor 410 may activate a specific application that generates a speech recognition model using repeated spoken words as voice input. As such, the processor 410 may generate and store a speech recognition model.

In one embodiment, the processor 410 may receive a voice command from the outside of the electronic device 400 through a wireless communication circuit (not shown). For example, the processor 410 may receive a voice command through the microphone. The processor 410 may also receive a voice command from an external device engaged in a call with the electronic device 400.

In one embodiment, the processor 410 may process a voice command using a selected speech recognition model. The processor 410 may activate a function according to the voice command. For example, the processor 410 may activate a speech recognition application on the basis of the frequency band of the call and selected speech recognition model. A voice command may include an utterance selected for recognition. A selected utterance may correspond to a word, phrase, or sentence selected by the user and may be changed.

In various embodiments, the processor 410 may select one of the codec modes at least partially on the basis of the phone number of an external device engaged in a call with the electronic device 400. For example, the processor 410 may use the history of calls with a particular external device to identify the frequency band of the current call with the external device. On the basis of the identified frequency band (e.g. narrowband, wideband, and super-wideband), the processor 410 may select one of the speech recognition models.

In various embodiments, the processor 410 may display a graphical user interface on the screen to permit selection of at least one device from which a voice command is to be received. For example, the processor 410 may determine the electronic device 400 and/or the counterpart external device as a source device for the voice command. The processor 410 may display a graphical user interface for determining a source device for the voice command on the display (not shown).

Upon detection of user input, the processor 410 may receive a voice command from at least one of the electronic device 400 and an external device engaged in a call with the electronic device 400.

In various embodiments, when a call is not set up within a given time (e.g. 50 seconds, 1 minute, or 2 minutes) after reception of a call request, the processor 410 may automatically set up the call.

In various embodiments, when a voice input is not received through the audio input interface (e.g. speaker) within a given time after a call is set up with an external device, the processor 410 may send pre-stored text data to the external device. For example, when a call request is received from an external device while the user is not present, the processor 410 may set up a call using the speech recognition module 425. Here, the processor 410 may determine that the user is absent when voice data other than ambient noise is not input for a given time (e.g. 15 seconds, 20 seconds, or 30 seconds).

In various embodiments, the processor 410 may display data received from the external device as text data on a call-related window. For example, the processor 410 may convert voice data from the external device into text data. The processor 410 may store the text data and display the same on the screen.

In various embodiments, the processor 410 may display a graphical user interface for determining whether to activate a real-time messaging application when a second call request is received from another external device during the ongoing call. The real-time messaging application may be an application enabling multiple electronic devices to exchange and display text messages.

When a selection is made to activate the real-time messaging application, the processor 410 may use the real-time messaging application to send and receive text data to and from the external device having sent the second call request. For example, while a call is in progress with a first external device, when a call request is received from a second external device, the processor 410 may send and receive text data to and from the second external device though the real-time messaging application.

In one embodiment, during a call with an external device, the processor 410 may convert voice data from the external device into text data. In response to a request signal, the processor 410 may store the text data and display the text data on a window associated with the external device.

In various embodiments, the electronic device 400 may send information on the selected codec mode to a server 450 through a wireless communication circuit (not shown). The server 450 may include a speech recognition model database 451. The speech recognition model database 451 may store speech recognition models for different frequency bands and users.

In various embodiments, the processor 410 may receive a voice command from the outside of the electronic device 400 through a wireless communication circuit (not shown). The processor 410 may receive a voice command through the microphone, or receive a voice command from an external device engaged in a call with the electronic device 400. The processor 410 may activate one function of the electronic device 400 in response to the voice command.

In various embodiments, the processor 410 may send a voice command to the server 450 through a wireless communication circuit (not shown). The processor 410 may receive data or information from the server 450 as a result of processing the voice command. The voice command may include an utterance selected for speech recognition.

The hardware codec 440 may be used to digitize audio signals input or output through the microphone or the speaker. The hardware codec 440 may forward a digitized audio signal to the processor 410.

In the above description, the processor 410 is depicted as including the AP 420 and the CP 430. However, the present disclosure is not limited thereto or thereby, and the AP 420 and the CP 430 may be configured as separate processors.

Figure 5:
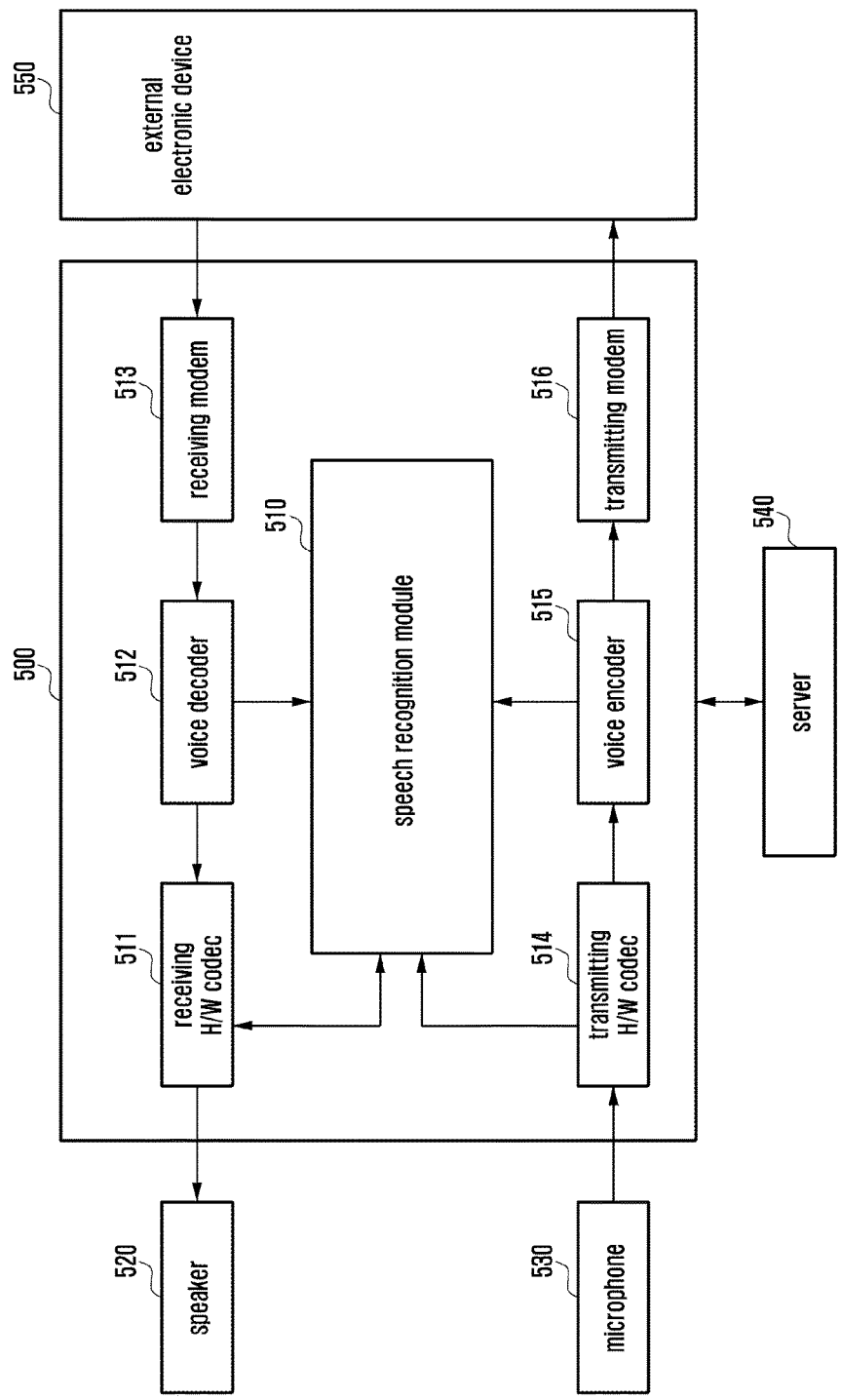
FIG. 5 is a block diagram illustrating an example electronic device according to various example embodiments of the present disclosure.

FIG. 5 is a block diagram illustrating an example electronic device 500 according to various example embodiments of the present disclosure.

The electronic device 500 may correspond to the electronic device 101 illustrated in FIG. 1, the electronic device 201 illustrated in FIG. 2, or the electronic device 400 illustrated in FIG. 4. The electronic device 400 may further include one or more components comparable with those of the electronic device 101, 201 or 400.

In various embodiments, the electronic device 500 may include a speech recognition module 510, a receiving hardware codec 511, a voice decoder 512, a receiving modem 513, a transmitting hardware codec 514, a voice encoder 515, a transmitting modem 516, a speaker 520, and a microphone 530.

In FIG. 5, the receiving hardware codec 511 and the transmitting hardware codec 514 are only an example of functional division for ease of description, and may be combined into one hardware codec. The voice decoder 512 and the voice encoder 515 are only an example of functional division for ease of description, and may be combined into one speech codec. The receiving modem 513 and the transmitting modem 516 are only an example of functional division for ease of description, and may be combined into one modem.

In various embodiments, during an ongoing call, the electronic device 500 may receive voice input through the microphone 530 or receive voice input from an external device engaged in the call through a wireless communication circuit. When voice input is received through the microphone 530, the voice input may be preprocessed and converted into a digital signal through the transmitting hardware codec 514 (e.g. pulse code modulation (PCM)). The transmitting hardware codec 514 may forward the digital signal to the speech recognition module 510 and the voice encoder 515.

In one embodiment, the speech recognition module 510 may determine whether a received voice signal contains a voice command for activating a speech recognition application.

The voice encoder 515 may encode a voice signal received from the transmitting hardware codec 514. The voice encoder 515 may forward the encoded voice signal to the speech recognition module 510 and forward the same to the transmitting modem 516, which may send the voice signal to the external device 550 through a wireless communication circuit (not shown). For example, a voice signal from the transmitting hardware codec 514 may be sent to the transmitting modem 516 through a speech codec (not shown) and a call/communication protocol (not shown). The transmitting modem 516 may send the voice signal to the external device 550.

In one embodiment, the electronic device 500 may receive a voice signal from the external device 550 through the receiving modem 513. The receiving modem 513 may forward the received voice signal to the voice decoder 512.

The voice decoder 512 may decode the voice signal and forward the decoded voice signal to the receiving hardware codec 511. The receiving hardware codec 511 may output the received voice signal and exchange information on the frequency band of the call with the speech recognition module 510. The voice decoder 512 may send the speech recognition module 510 an encoding signal for speech recognition and speech codec information.

In one embodiment, the speech recognition module 510 may select a speech recognition model on the basis of the frequency bandwidth indication of the receiving hardware codec 511 or the transmitting hardware codec 514. For example, when a call with the external device 550 is in progress through a wireless communication circuit (not shown), the electronic device 500 may use a speech codec operating at a specific frequency bandwidth. As another example, the electronic device 500 may set up a narrowband call, wideband call, or super-wideband call with a counterpart device on the basis of information on the communication operator and states of the counterpart device. When a wideband voice call is set up, the electronic device 500 may select a wideband one of the speech recognition models.

In various embodiments, the electronic device 500 may send and receive data to and from the server 540 including a speech recognition model database. The speech recognition model database may store multiple speech recognition models for different frequency bands and users. For example, the speech recognition module 510 may identify the codec mode associated with a voice call with the external device 550 and send a request to the server 540 to return a speech recognition model for the frequency band corresponding to the identified codec mode. Upon reception of the speech recognition model from the server 540, the electronic device 500 may activate the voice command function on the basis of the received speech recognition model.

According to various embodiments of the present disclosure, an electronic device may include: a housing having a surface; a display disposed in the housing and exposed through the surface; an audio input interface comprising audio input circuitry disposed in the housing; an audio output interface comprising audio output circuitry disposed in the housing; at least one wireless communication circuit disposed in the housing and configured to select one of plural communication protocols for call setup; a processor disposed in the housing and electrically connected with the display, the audio input interface, the audio output interface, the at least one wireless communication circuit, and a codec; and a memory electrically connected with the processor. The memory may store at least one codec supporting multiple modes associated with different frequency bands. The memory may store instructions that, when executed, cause the processor to set up a call using the wireless communication circuit, to select one of the modes based on the selected communication protocol, to select one of the speech recognition models based on the selected mode, to receive a voice command from the outside of the electronic device using the wireless communication circuit, and to process the voice command using the selected speech recognition model.

In an example embodiment, the instructions may cause the processor to activate a function of the electronic device based on the voice command. The voice command may include an utterance selected for speech recognition.

In an example embodiment, the instructions may cause the processor to select one of the modes based on the phone number of an external device engaged in a call with the electronic device.

In an example embodiment, the instructions may cause the processor to display a graphical user interface on the screen to permit selection of at least one device from which a voice command is to be received, and to receive a voice command from at least one of the electronic device and an external device engaged in a call with the electronic device upon detection of user input.

In an example embodiment, the instructions may cause the processor to send pre-stored text data to an external device when either a call is automatically set up owing to absence of a call answering signal for a given time after reception of a call request from the external device or a voice input is not received through the audio input interface within a given time after the call is set up, and to display text data received from the external device on the call-related window.

In an example embodiment, the instructions may cause the processor to display a graphical user interface for determining whether to activate a real-time messaging application when a second call request is received from another external device during the ongoing call, and to use, when a selection is made to activate the real-time messaging application, the real-time messaging application to send and receive text data to and from the external device having sent the second call request.

In an example embodiment, the instructions may cause the processor to convert, upon reception of a request signal during a call with an external device, voice data from the external device into text data, to store the text data, and to display the text data on a window associated with the external device.

According to various example embodiments of the present disclosure, an electronic device may include: a housing having a surface; a display disposed in the housing and exposed through the surface; an audio input interface comprising audio input circuitry disposed in the housing; an audio output interface comprising audio output circuitry disposed in the housing; at least one wireless communication circuit disposed in the housing and configured to select one of communication protocols for call setup; a processor disposed in the housing and electrically connected with the display, the audio input interface, the audio output interface, the at least one wireless communication circuit, and a codec; and a memory electrically connected with the processor. The memory may store at least one codec supporting multiple modes associated with different frequency bands. The memory may store instructions that, when executed, cause the processor to set up a call using the wireless communication circuit, to select one of the modes based on the selected communication protocol, to send information on the selected mode to a server using the wireless communication circuit, to receive a voice command from the outside of the electronic device using the wireless communication circuit, to send the voice command to the server using the wireless communication circuit, and to receive data or information from the server as a result of processing the voice command.

In an example embodiment, the processor may activate a function of the electronic device based on the received data or information. The voice command may include an utterance selected for speech recognition.

Figure 6:
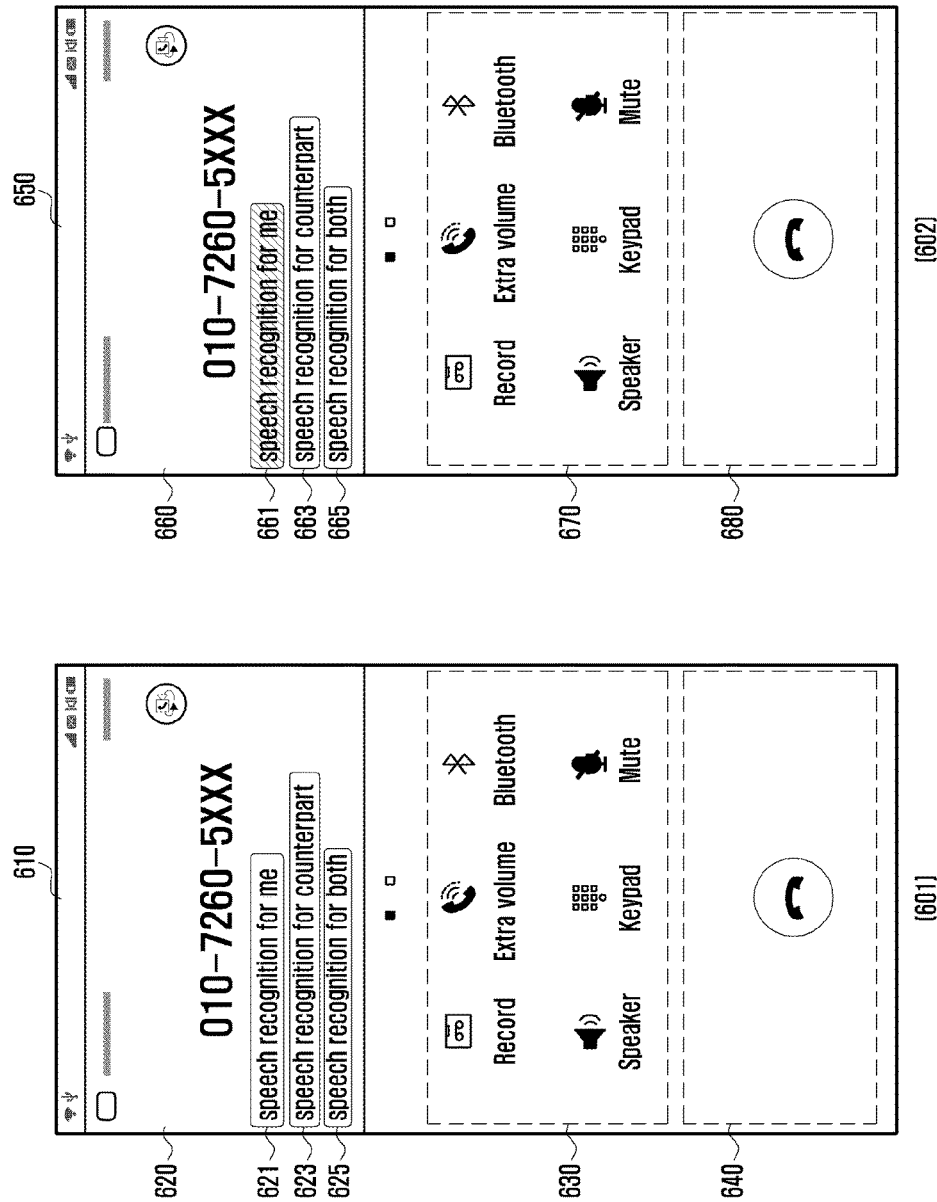
FIG. 6 is a diagram illustrating an example graphical user interface for speech recognition during a call according to various example embodiments of the present disclosure.

FIG. 6 is a diagram illustrating an example graphical user interface for speech recognition during a call according to various example embodiments of the present disclosure.

In various embodiments, the electronic device 400 may connect to an external device and set up a call with the external device through the wireless communication circuit. During the call with the external device, the electronic device 400 may display a graphical user interface on the screen for selective speech recognition.

As indicated by indicia 601, the electronic device 400 may display an indicator UI 610, a speech recognition UI 620, a function UI 630, and a call UI 640 on the screen. The indicator UI 610 may be used to indicate the battery power level, current time, and the like. For selective speech recognition, the speech recognition UI 620 may include a UI item 621 for the user of the electronic device 400, a UI item 623 for the user of the counterpart device, and a UI item 625 for the users of the electronic device 400 and the counterpart device.

The function UI 630 may include UI items for keypad display, Bluetooth usage, and sound recording. The call UI 640 may include a UI item for call termination.

As indicated by indicia 602, upon detection of user input on a UI item (e.g. UI item 661) of the speech recognition UI 660, the electronic device 400 may perform a function corresponding to the user input. The electronic device 400 may display an indicator UI 650, a speech recognition UI 660, a function UI 670, and a call UI 680 on the screen.

When a UI item (e.g. UI item 661) is selected, the electronic device 400 may change the color of the selected UI item, and perform a function mapped with the selected UI item. For example, when the UI item 661 is selected for speech recognition of the user, the electronic device 400 may pick up a voice signal of the user through the microphone, recognize the voice signal, and process a voice command. For instance, the electronic device 400 may activate a specific application indicated by the voice command.

Figure 7:
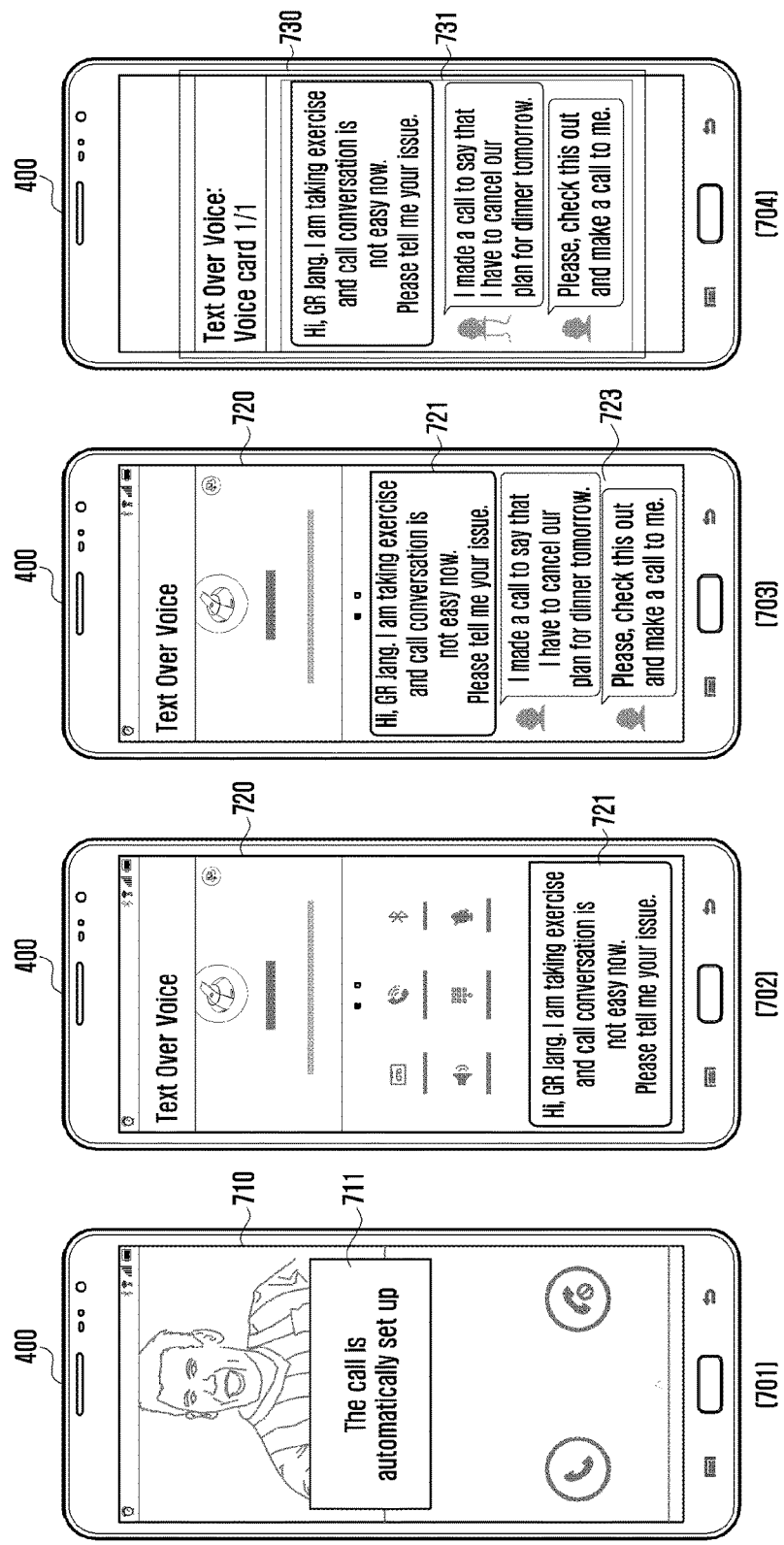
FIG. 7 is a diagram illustrating an example automatic call setup through a speech recognition module according to various example embodiments of the present disclosure.

FIG. 7 is a diagram illustrating an example of automatic call setup through the speech recognition module 425 or 510 according to various example embodiments of the present disclosure.

Upon reception of a call request from an external device, when a specified condition is met, the speech recognition module 425 or 510 of the electronic device 400 may set up a call with the external device to exchange text data.

As indicated by indicia 701, upon reception of a call request from an external device, the electronic device 400 may display a call UI 710 on the screen. When an input signal for accepting the call request is not received within a given time (e.g. 40 seconds, 1 minute, or 2 minutes), the speech recognition module 425 may automatically set up the call.

In an example embodiment, the electronic device 400 may generate in advance a list of external devices with which the speech recognition module 425 is allowed to automatically set up a call. For example, when an external device is not on the call log, the speech recognition module 425 may be not allowed to automatically set up a call with the external device. When a call is automatically set up, the electronic device 400 may display a UI item 711 indicating automatic call setup.

As indicated by indicia 702, the electronic device 400 may send a text message 721 for notification to the external device engaged in the call. Such a text message to be sent may be pre-stored.

As indicated by indicia 703, the electronic device 400 may receive a voice signal or text data from the external device. When a voice signal is received, the electronic device 400 may convert the voice signal into text data and store the text data. The electronic device 400 may display the text data 723 (received from the external device) in association with the notification message 721 on the connection UI 720.

As indicated by indicia 704, the electronic device 400 may output a notification signal to the user through the speech recognition module 425. The electronic device 400 may display text messages 731 exchanged with the external device on the notification UI 730.

Figure 8:
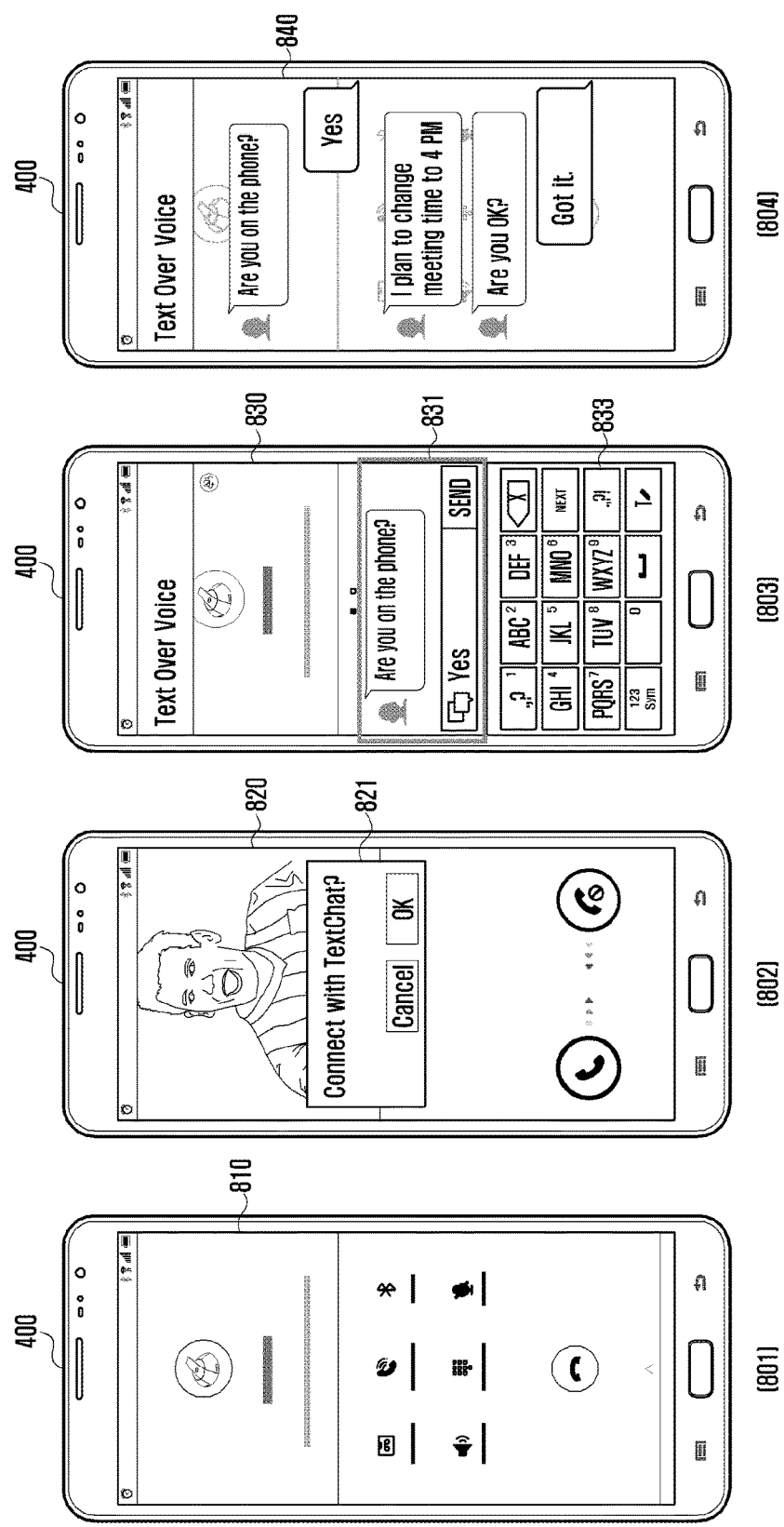
FIG. 8 is a diagram illustrating an example of handling a second call request during one call through the speech recognition module according to various example embodiments of the present disclosure.

FIG. 8 is a diagram illustrating an example of handling a second call request during one call through the speech recognition module 425 or 510 according to various example embodiments of the present disclosure.

The speech recognition module 425 or 510 of the electronic device 400 may activate a real-time messaging application that can send and receive text data during an ongoing call.

As indicated by indicia 801, when a call is set up with a first external device, the electronic device 400 may display a call UI 810 on the screen.

As indicated by indicia 802, when another call request is received, the electronic device 400 may display a call request UI 820 on the screen. The electronic device 400 may display a notification UI 821 for determining whether to activate a real-time messaging application so as to exchange text data with the second external device during the call with the first external device.

As indicated by indicia 803, when a selection is made to activate the real-time messaging application, the electronic device 400 may activate the real-time messaging application together with the second external device during the call with the first external device. The electronic device 400 may display a messaging UI 830 containing a text data window 831 and a keypad window 833. For example, the electronic device 400 may activate a real-time messaging application through Session Initiation Protocol (SIP).

As indicated by indicia 804, the electronic device 400 may display text messages exchanged with the second external device in chronological order on the messaging application UI 840.

Figure 9:
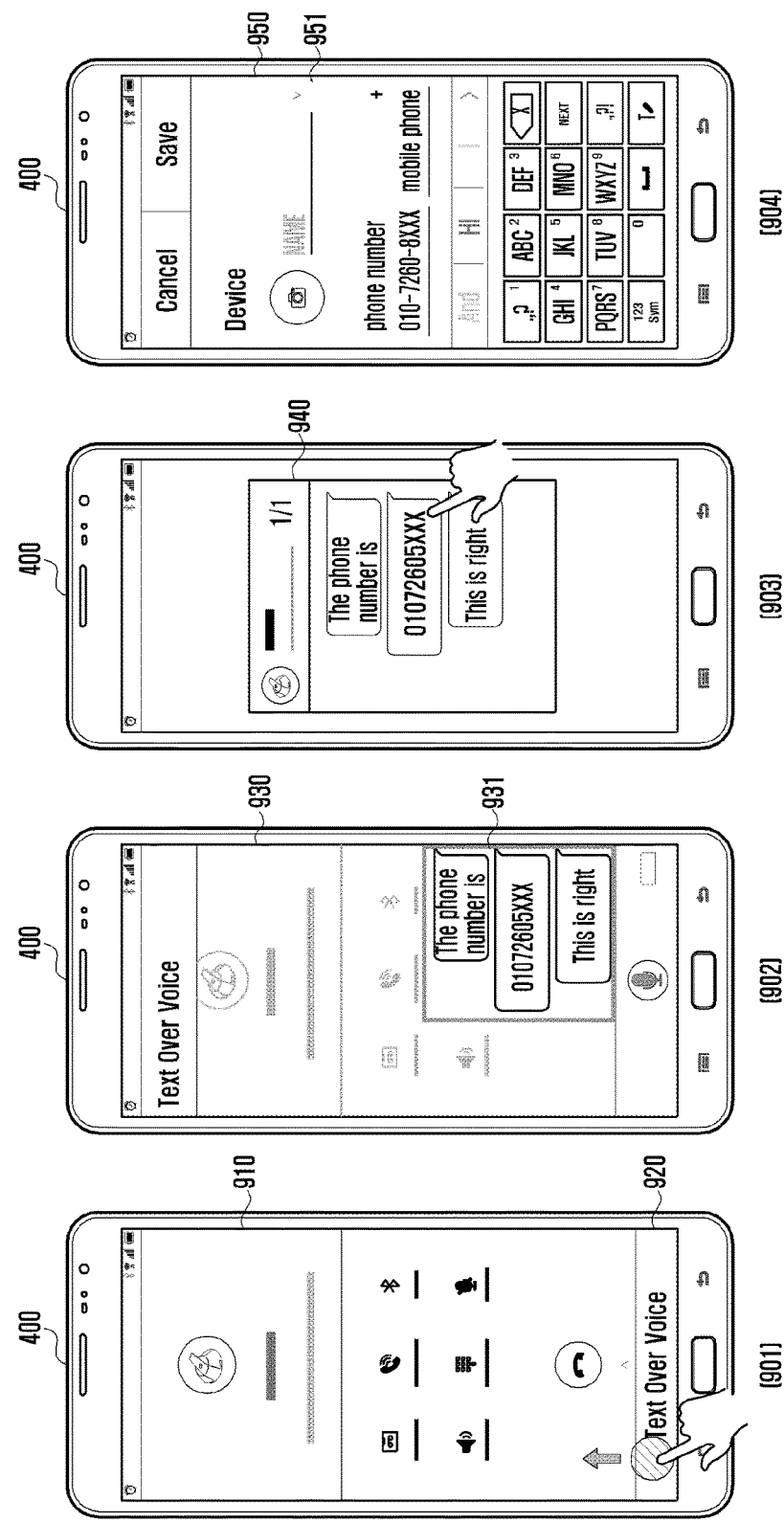
FIG. 9 is a diagram illustrating an example function performed by the speech recognition module to convert and store the speech of the counterpart as text data according to various example embodiments of the present disclosure.

FIG. 9 is a diagram illustrating an example function performed by the speech recognition module 425 or 510 to convert and store the speech of the counterpart as text data according to various example embodiments of the present disclosure.

In various embodiments, the electronic device 400 may convert a voice signal from an external device into text data and store the text data by using the speech recognition module 425.

As indicated by indicia 901, when a call is set up with an external device, the electronic device 400 may display a call UI 910 on the screen. And the electronic device 400 may select a memo UI 920 during a call by use of the speech recognition module 425. The memo UI 920 may be used for speech recognition of a voice signal from the external device.

As indicated by indicia 902, the electronic device 400 may use the speech recognition module 425 to convert a voice signal into text data, and display the text data 931 on the memo UI 930 displayed on the screen or store the same.

As indicated by indicia 903, the electronic device 400 may display messages exchanged with the counterpart device on a message list UI 940.

As indicated by indicia 904, the electronic device 400 may store messages exchanged during a call so that the messages are associated with the contact 950 of the counterpart like a phone number 951.

Figure 10:
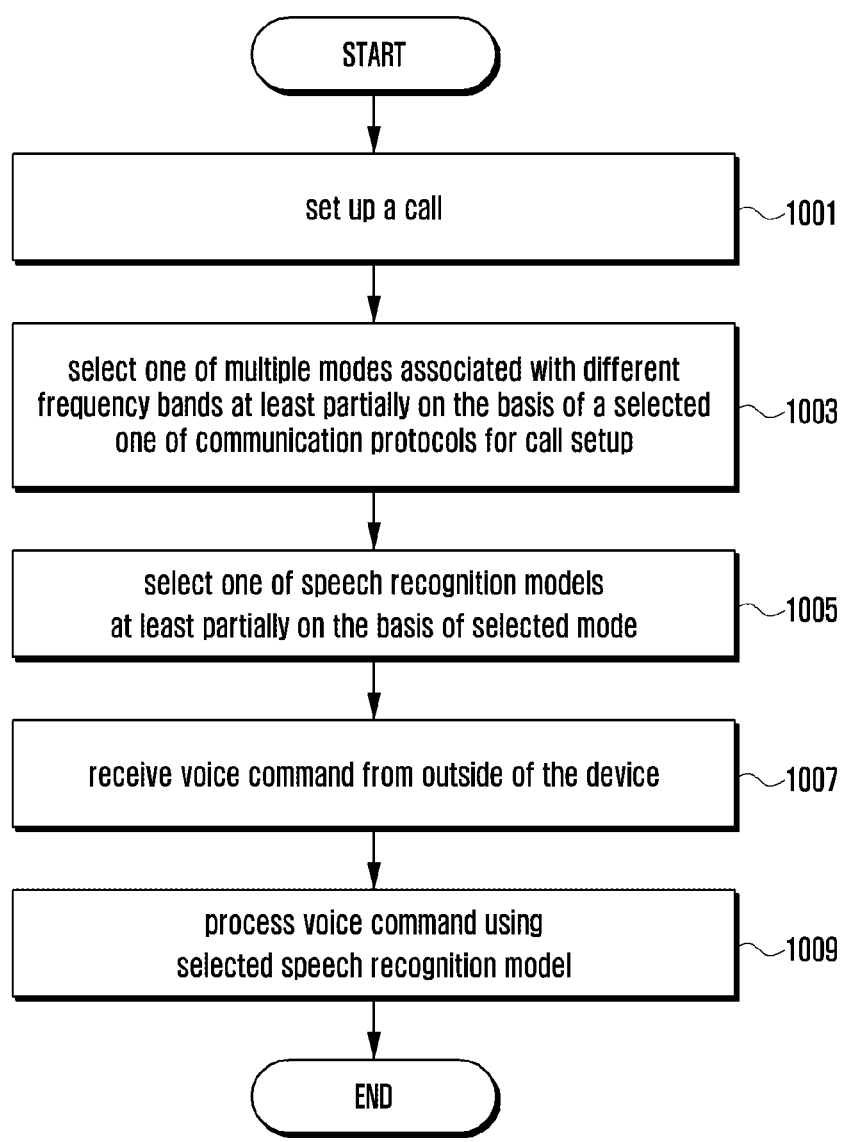
FIG. 10 is a flowchart illustrating an example procedure for processing voice commands in an electronic device according to various example embodiments of the present disclosure.

FIG. 10 is a flowchart illustrating an example procedure for processing voice commands in an electronic device according to various example embodiments of the present disclosure.

Referring to FIG. 10, at step 1001, the electronic device 400 sets up a call. The electronic device 400 may set up a call with an external device through a wireless communication circuit.

In an example embodiment, when a call is not set up within a given time after reception of a call request, the electronic device 400 may automatically set up the call by use of the speech recognition module 425. After call setup, the electronic device 400 may send pre-stored text data to the external device engaged in the call. The electronic device 400 may display text data received from the external device on the call-related window.

At step 1003, the electronic device 400 selects one of multiple modes associated with different frequency bands at least partially on the basis of a selected one of communication protocols. The electronic device 400 may identify the frequency band of the voice call signal in the course of protocol negotiation with the external device. For example, the electronic device 400 may check whether the voice call is of narrowband, wideband, or super-wideband.

In an example embodiment, the electronic device 400 may select one of the codec modes at least partially on the basis of the phone number of the external device engaged in the call.

At step 1005, the electronic device 400 selects one of speech recognition models at least partially on the basis of the selected mode. The electronic device 400 may pre-store speech recognition models for different frequency bands. For example, the electronic device 400 may store a narrowband speech recognition model, wideband speech recognition model, and super-wideband speech recognition model. The electronic device 400 may select one of the pre-stored speech recognition models according to the frequency band of the voice call signal.

In an example embodiment, when a speech recognition model for the call is not stored, the electronic device 400 may provide the user with an interface to generate a speech recognition model. For example, a speech recognition model may be generated by using repeated spoken words or phrases as voice input.

At step 1007, the electronic device 400 receives a voice command from the outside. For example, the electronic device 400 may receive a voice command from the microphone or from the external device through the wireless communication circuit.

In an example embodiment, the electronic device 400 may display a graphical user interface on the screen to permit selection of at least one device from which a voice command is to be received. The electronic device 400 may determine the electronic device 400 and/or the external device as a source device for the voice command according to user input.

At step 1009, the electronic device 400 processes the voice command by using the selected speech recognition model. The electronic device 400 may activate a function thereof according to the voice command. The voice command may contain an utterance selected for speech recognition. For example, a specific application like a speech recognition application may be activated.

In an example embodiment, after call setup, the electronic device 400 may store information on the communication protocol of the external device engaged in the call.

In an example embodiment, when a second call request is received from another external device during the ongoing call, the electronic device 400 may display a graphical user interface for determining whether to activate a real-time messaging application. When a selection is made to activate the real-time messaging application, the electronic device 400 may use the real-time messaging application to send and receive text data to and from the external device having sent the second call request.

In an example embodiment, upon reception of a request signal during the call with the external device, the electronic device 400 may convert voice data from the external device into text data and store the text data. The electronic device 400 may display the text data on a window associated with the external device.

Figure 11:
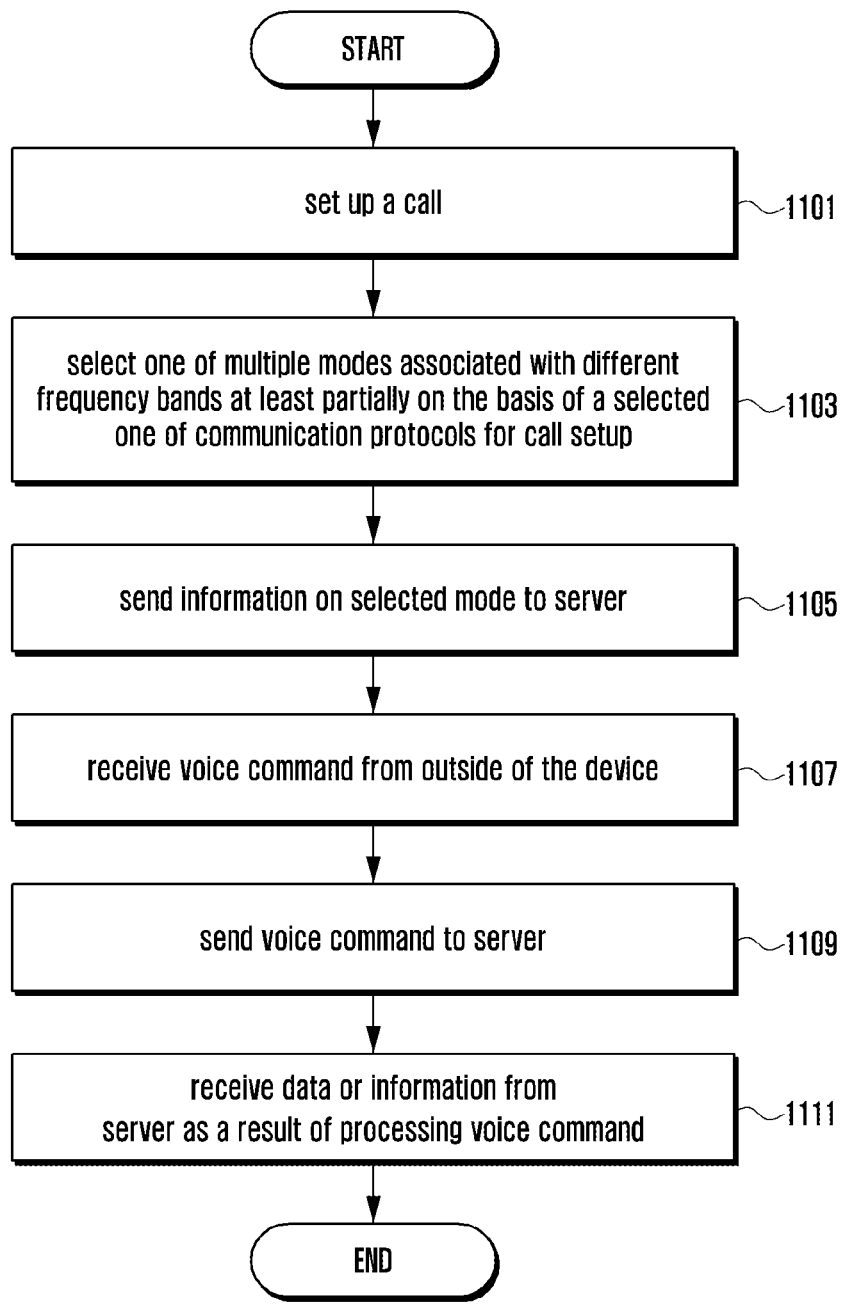
FIG. 11 is a flowchart illustrating an example procedure for processing voice commands in an electronic device according to various example embodiments of the present disclosure.

FIG. 11 is a flowchart illustrating an example procedure for processing voice commands in an electronic device according to various example embodiments of the present disclosure.

At step 1101, the electronic device 400 sets up a call through the wireless communication circuit. The electronic device 400 may set up a call with an external device through the wireless communication circuit.

At step 1103, the electronic device 400 selects one of multiple modes associated with different frequency bands at least partially on the basis of a selected one of communication protocols. The electronic device 400 may identify the frequency band of the voice call signal in the course of protocol negotiation with the external device. For example, the electronic device 400 may check whether the voice call is of narrowband, wideband, or super-wideband.

At step 1105, the electronic device 400 sends information on the selected mode to a server. The server may include a database containing multiple speech recognition models.

At step 1107, the electronic device 400 receives a voice command from the outside. For example, the electronic device 400 may receive a voice command from the microphone or from the external device through the wireless communication circuit.

At step 1109, the electronic device 400 sends the voice command to the server. The voice command may include an utterance selected for speech recognition.

At step 1111, the electronic device 400 receives data or information from the server as a result of processing the voice command. The electronic device 400 may activate a function thereof according to the data or information received from the server. For example, a specific application may be activated.

According to various example embodiments of the present disclosure, a method for processing voice commands in an electronic device may include: setting up a call through a wireless communication circuit; selecting one of multiple modes associated with different frequency bands based on a selected one of communication protocols for call setup; selecting one of speech recognition models based on the selected mode; receiving a voice command from the outside of the electronic device through the wireless communication circuit; and processing the voice command by use of the selected speech recognition model. The method may further include activating a function of the electronic device based on the voice command. The voice command may include an utterance selected for speech recognition. Selecting one of multiple modes may include selecting one of the modes at least partially on the basis of the phone number of an external device engaged in the call. Receiving a voice command may include: displaying a graphical user interface on the screen for selecting at least one device from which a voice command is to be received; and receiving, upon detection of user input, a voice command from at least one of the electronic device and an external device engaged in the call with the electronic device. Setting up a call may include automatically setting up a call when a call answering signal is not received for a given time after reception of a call request from an external device. The method may further include: sending pre-stored text data to the external device engaged in the call; and displaying text data received from the external device on a call-related window. The method may further include: displaying, when a second call request is received from another external device during the ongoing call, a graphical user interface for determining whether to activate a real-time messaging application; and utilizing, when a selection is made to activate the real-time messaging application, the real-time messaging application to send and receive text data to and from the external device having sent the second call request. The method may further include: converting, upon reception of a request signal during the call, voice data from the external device into text data and storing the text data; and displaying the text data on a window associated with the external device. The method may further include storing information on a communication protocol of the external device engaged in the call after call setup.

In an example feature of the present disclosure, it is possible to increase the speech recognition accuracy during a call by performing speech recognition using different speech recognition models stored for different frequency bands.

When a call is not set up within a given time after reception of a call request, the call is automatically set up and a corresponding message is sent. Hence, it is possible to enhance user convenience.

In addition, while one call is in progress, the electronic device may send and receive text data through a real-time messaging application to and from the counterpart external device of the call or a second external device making another call request. This may increase the processing efficiency of the electronic device, reduce battery power consumption, and enhance user convenience.

The term "module" as used in this disclosure may refer to a certain unit that includes one or more of hardware (e.g., circuitry), software and firmware or any combination thereof. The term module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a processor (e.g., processing circuitry, CPU, dedicated processor, etc.) ASIC (application-specific integrated circuit) chip, FPGAs (field-programmable gate arrays), and programmable-logic device, which have been known or are to be developed.

It will be understood that the above-described example embodiments are examples provided to aid in easy understanding of the contents of the present disclosure and do not limit the scope of the present disclosure. Accordingly, the scope of the present disclosure is defined by the appended claims, and it will be understood that all modifications derived from the meanings and scope of the following claims and the equivalent concept fall within the scope of the present disclosure.

What is claimed is:

1. An electronic device comprising:
    a housing;
    a display disposed on a surface on the housing;
    an audio input interface comprising audio input circuitry disposed in the housing;
    an audio output interface comprising audio output circuitry disposed in the housing;
    at least one wireless communication circuit disposed in the housing and configured to select one of plural different communication protocols for call setup;
    a processor disposed in the housing and electrically connected with the display, the audio input interface, the audio output interface, and the at least one wireless communication circuit; and
    a memory electrically connected with the processor,
    wherein the memory stores at least one codec supporting multiple modes each respectively associated with a different frequency band and a plurality of speech recognition models being respectively associated with the different frequency band,
    wherein the memory stores instructions that, when executed, cause the processor to perform operations comprising:
    controlling setting up a call using the wireless communication circuit,
    selecting one of the multiple modes based on the selected communication protocol,
    selecting one of the plurality of speech recognition models based on a frequency band corresponding to the selected mode,
    receiving a voice command from the outside of the electronic device using the wireless communication circuit, and
    processing the voice command using the selected speech recognition model.

2. The electronic device of claim 1, wherein the operations further comprise: activating a function of the electronic device based on the voice command.

3. The electronic device of claim 1, wherein the voice command comprises an utterance selected for speech recognition.

4. The electronic device of claim 1, wherein the operations further comprise: identifying a frequency band based on the phone number of an external device associated with the call.

5. The electronic device of claim 1, wherein the operations further comprise:
    displaying on the display a graphical user interface for selecting at least one device from which a voice command is receivable, and
    receiving a voice command from at least one of the electronic device and an external device engaged in a call with the electronic device based on an input to the user interface.

6. The electronic device of claim 1, wherein the operations further comprise: sending pre-stored text data to an external device when either a call is automatically set up based on an absence of a call answering signal for a given time after reception of a call request from the external device or if a voice input is not received through the audio input interface within a given time after the call is set up, and displaying on the display text data received from the external device.

7. The electronic device of claim 1, wherein the operations further comprise: displaying a graphical user interface for determining whether to activate a real-time messaging application when a second call request is received from another external device during the call, and using, when a selection is made to activate the real-time messaging application, the real-time messaging application to send and receive text data to and from the other external device.

8. The electronic device of claim 1, wherein the operations further comprise: converting, upon reception of a request signal during a call with an external device, voice data from the external device into text data, storing the text data, and displaying the text data on the display.

9. A method for processing voice commands in an electronic device, the method comprising:
   setting up a call through a wireless communication circuit;
   selecting one of multiple modes each associated with a different frequency band based on a communication protocol selected for the call setup;
   selecting one of a plurality of speech recognition models based on a frequency band corresponding to the selected mode, the plurality of speech recognition models being respectively associated with the different frequency band;
   receiving a voice command from the outside of the electronic device through the wireless communication circuit; and
   processing the voice command using the selected speech recognition model,
   wherein setting up a call comprises automatically setting up a call when a call answering signal is not received for a predetermined time after reception of a call request from an external device and the method further comprises:
      sending pre-stored text data to the external device engaged in the call; and
      displaying text data received from the external device.

10. The method of claim 9, further comprising activating a function of the electronic device based on the voice command.

11. The method of claim 9, wherein the voice command comprises an utterance selected for speech recognition.

12. The method of claim 9, further comprising identifying a frequency band based on a phone number of the external device associated with the call.

13. The method of claim 9, further comprising:
   displaying a graphical user interface for selecting at least one device from which a voice command is receivable; and
   receiving a voice command from at least one of the electronic device and the external device engaged in the call with the electronic device based on an input to the user interface.

14. The method of claim 9, further comprising:
   displaying, when a second call request is received from another external device during an ongoing call, a graphical user interface for determining whether to activate a real-time messaging application; and
   utilizing, when a selection is made to activate the real-time messaging application, the real-time messaging application to send and receive text data to and from the other external device.

15. The method of claim 9, further comprising:
   converting, upon reception of a request signal during the call, voice data from the external device into text data and storing the text data; and
   displaying the text data.

16. The method of claim 9, further comprising storing information on a communication protocol of the external device engaged in the call after the call setup.

* * * * *